3,303,662
PROCESS FOR CELL PRESERVATION
Sheldon W. Moline, Eggertsville, and Arthur W. Rowe, Tonawanda, N.Y., assignors to Union Carbide Corporation, a corporation of New York
No Drawing. Filed Jan. 23, 1964, Ser. No. 339,577
5 Claims. (Cl. 62—62)

This application is a continuation-in-part of application Serial No. 262,223, filed March 1, 1963, now abandoned.

This invention relates to a process for preserving cells. More particularly, the invention is directed to a process for preserving at low temperatures cells derived from animal tissue.

Viable cells obtained from tissues of various animals have many important uses. For example, cells obtained from animal organs, such as kidney cells, provide growth media for virus particularly in the production of vaccines. Bone marrow, another form of tissue, is being used increasingly in medical practice in treatment of certain types of anemia, cancer therapy, and in treatment for exposure to high levels of radiation.

It is an object of this invention to provide a process for the low temperature preservation of viable cells obtained from animals.

Another object of this invention is to provide a method for preserving viable cells over long periods of time.

A further object of this invention is to provide a means for preserving tissue cells in a condition suitable for supporting virus growth in vaccine production.

These and other objects and advantages of this invention will be apparent from the following description and appended claims.

The term "tissue," as used herein, means an aggregate of cells, with their intercellular substance, forming one of the structural materials of an animal. This definition includes tissue in the form of body organs and bone marrow, but excludes body fluids, blood, and cells originally present in the animal as individual cells, such as erythrocytes and leucocytes.

Broadly stated, the process of this invention comprises the steps of (1) contacting animal tissue cells with a protective additive to reduce cell damage during freezing and thawing; (2) cooling the cell-additive combination until the combination has solidified and latent heat of fusion has been removed; (3) further cooling the solidified cells to about $-50°$ C. at a rate of not more than about $3°$ C. per minute, and (4) further cooling the frozen cells and maintaining the frozen cells at a temperature below about $-75°$ C.

The process of this invention is generally applicable to the preservation of tissue cells from any animal, preferably mammals. For example, bone marrow and tissue of kidneys, liver, heart, spleen, lungs, and the like, obtained from birds, reptiles, fish, rabbits, monkeys, cats, dogs, rodents, horses, human beings, and the like, can be preserved by the process of this invention.

Cells for use in the process of this invention are obtained from donor animals by conventional procedures. Several procedures for obtaining various types of cells and cell aggregates are described in detail in the discussion which follows.

The process of this invention is applicable to tissue in the form of cell aggregates of relatively small size, as for example, bone marrow or finely minced tissue; as well as to the preservation of tissue in the form of large cell aggregates including whole organs such as kidneys and lungs. The process of this invention is also applicable to cells originally present in the animal as part of a tissue cell aggregate but which have been broken down into individual cells prior to freezing.

The cells to be preserved are contacted with protective additives which reduce damage to the cells during the freezing and thawing steps. The cells can be brought into contact with the protective additive by any convenient method, for example, by perfusing a whole organ with a liquid medium containing a protective additive, by suspending cell aggregates or individual cells in a liquid medium containing a protective additive, or by pouring a liquid medium containing a protective additive over the cell aggregates. Where the whole organ is to be preserved by the process of this invention, it is sufficient to perfuse the organ with the liquid medium containing the protective additive and then to freeze the organ without further treatment. Where bone marrow, minced tissue or individual tissue cells are to be preserved by the process of this invention, it is preferable to prepare a suspension of the cell aggregates or individual cells in a liquid medium containing a protective additive and then freeze the entire suspension.

The following compounds are illustrative of the protective additives useful in the present invention: glycerol; ethylene glycol; aldoses and ketoses such as xylose, erythrose, arabinose, ribose, glucose, fructose and galactose; polysaccharides such as maltose, sucrose, lactose and raffinose; dextran; polyvinylpyrrolidone; serum albumin; dimethylsulfoxide; mannitol; and urea. Mixtures of two or more of these protective additives can also be used.

Some of the protective additives, such as glycerol and monosaccharides, permeate the external membrane of the individual cells. Other protective additives, such as polysaccharides and polyvinylpyrrolidone, do not enter the cell membrane. The different chemical and physiological properties of these "intracellular" and "extracellular" protective additives is well recognized and understood in the art.

In the process of this invention it is preferable to employ the protective additive in a liquid medium which includes, in addition, nutrients for the cells. Nutrients can include, for example, amino acids, saccharides, inorganic salts, proteins, vitamins and autologous, homologous or heterologous animal serum. The following are illustrative of perfusing and/or suspending media which are useful in the process of this invention. All percentages are volume percent unless otherwise noted.

(A)

| | Percent |
|---|---|
| Egg yolk | 10 |
| Serum | 20 |
| Glycerol | 20 |
| Eagle's MEM | 50 |

Eagle's Minimum Essential Medium (MEM) is a commercially available synthetic nutrient medium for cultivation of mammalian cells, either in monolayers or in suspension cultures. It is a complex mixture containing amino acids, vitamins, inorganic salts and glucose.

(B)

| | Percent |
|---|---|
| Egg yolk | 10 |
| Serum | 20 |
| Glycerol | 20 |
| TC-199 | 50 |

TC-199 is a commercially available nutrient medium which is somewhat richer in cell nutrients than MEM.

(C)

| | Percent |
|---|---|
| Egg yolk | 10 |
| Serum | 20 |

| | Percent |
|---|---|
| Dimethylsulfoxide (CH$_3$SCH$_3$) with =O | 10 |
| Eagle's MEM | 60 |

(D)

| | Percent |
|---|---|
| Egg yolk | 10 |
| Serum | 20 |
| Dimethylsulfoxide | 10 |
| TC-199 | 60 |

(E)

| | Percent |
|---|---|
| Serum | 20 |
| Dimethylsulfoxide | 10 |
| Eagle's MEM | 70 |

(F)

| | Percent |
|---|---|
| Centrolex F | 10 |
| Serum | 20 |
| Dimethylsulfoxide | 10 |
| Eagle's MEM | 60 |

"Centrolex F" is a commercially available nutrient medium comprising a 1% by weight dispersion in water of a crude soya bean phospholipid fraction. The phospholipid fraction consists essentially of a 1:1:1 mixture of lecithin, cephalin and phosphoinositide.

(G)

2.5 wt. percent glucose
0.6 wt. percent methylcellulose (15 centipoise viscosity)
20% serum
16.9% water
10% dimethylsulfoxide
50% Eagle's MEM The methylcellulose improves the efficiency of the perfusion step by increasing the viscosity of the perfusion medium and also enhances the integrity of cell membrane during trypsinization. The serum in the above media (A)–(G) can be autologous serum, homologous serum or heterologous serum.

The cells to be frozen can be cooled to the solidification temperature and further cooled to remove latent heat of fusion (that is, cooled until the change of phase from liquid to solid is completed) by conventional methods, for example, by immersion in a liquid refrigerant such as liquid nitrogen or by passing cold gas cover the material to be frozen. Apparatus is available commercially for freezing biological substances by these methods. The terms "solidification" and "liquid-solid phase change" as used herein, apply to both (a) liquid in which tissue cells or cell aggregates are suspended and (b) liquid present within the solid walls of individual cells or within the solid matrix of tissues and organs.

It is important for the solidified tissue cells, after the liquid-solid phase change is completed, to be cooled to temperatures of about −50° C. at a rate not in excess of about 3° C. per minute. It has been found that cooling at faster rates in this temperature range results in reduced viability of the cells. The temperature of −50° C. represents the approximate temperature at which all freezable water in the system has been converted to solid. Certain water in biological systems, for example, water bound by proteins or other hydrophilic compounds, is not freezable. The exact temperature at which all freezable water solidifies varies somewhat with the particular system involved, but in general all freezable water will have solidified at a temperature of about −50° C.

Once the temperature of about −50° C. has been reached the frozen cells can be further cooled at any desired rate to a temperature below about −75° C. Any refrigerant capable of producing temperatures below about −75° C. can be employed, for example, solid carbon dioxide, solid carbon dioxide-solvent mixtures, helium, neon, argon and nitrogen. A storage temperature of −75° C. is adequate for short storage periods. For longer storage, temperatures below about −130° C. are preferred. At liquid nitrogen temperatures about −170° C. down to −196° C.) viable tissue cells can be stored almost indefinitely. Nitrogen is the preferred refrigerant because it is readily available in large quantities, is biologically inert and non-toxic, and provides extremely low temperatures. Containers and apparatus for use in freezing tissue cells at controlled rates, as well as equipment for storing frozen tissue cells at temperatures from −75° C. to −196° C. are commercially available.

When the tissue cells preserved by the process of this invention are desired for further use, the frozen cells are thawed rapidly by conventional methods, preferably by means of a warm water bath, usually maintained at 37° C. Where a frozen suspension of single cells or cell aggregates (such as bone marrow or minced tissue) is to be thawed, the container holding the frozen cells can be immersed in a water bath and the contents agitated during the thawing process. Where a frozen whole organ is to be thawed, it is preferable to immerse the frozen organ in an isotonic warming fluid rather than directly in water. A suitable isotonic solution is "GKN" which has the following compositions:

| | G. per 1000 ml. of aq. sol. |
|---|---|
| Glucose | 1.0 |
| KCl | 4.0 |
| NaCl | 8.0 |

The warming fluid is maintained at a temperature of about 37° C. and may be agitated to enhance heat transfer to the immersed organ if desired. Thawing is preferably carried out as rapidly as possible, but the thawing fluid should not exceed the normal body temperature of the organ.

The thawed cells can then undergo further processing depending upon the desired use. For example, when tissue cells are needed to provide a growth medium for a virus as in vaccine production, the thawed minced organ (or a mince prepared from a thawed whole organ) is subjected to a standard trypsinization procedure which serves to break down the aggregates into individual cells, to disperse the cells, and to dilute out the protective additive. The individual cells are then cultured by standard methods to provide a growth medium for the virus.

Where bone marrow preserved by the process of this invention is to be used for transfusion into human beings and intracellular protective additives (such as glycerol or dimethylsulfoxide) are used, special post-thaw processing is required. The special processing involves partial removal of the protective additive by slow dilution techniques. It is essential that the additive concentration be reduced before transfusing the cells into a human being, since direct infusion leads to immediate osmotic shock to the cells. A suitable diluting procedure is to add one-half volume of physiological saline solution (0.85 wt. percent NaCl) to one volume of the thawed bone marrow suspension. Five to ten minutes later, one volume of saline is added to one volume of the previously diluted cell suspension. This procedure is repeated after an additional five to ten minutes, resulting in approximately a six-fold dilution of the original suspension. The dilute bone marrow suspension is then concentrated by centrifuging and discarding the supernatant liquid until the desired volume is attained. It is desirable to reduce the concentration of protective additive to below about 2.5% prior to transfusion. Glucose solutions can also be used as the diluting medium.

In a preferred embodiment of the invention, the tissue cells to be preserved are cooled through the phase change as rapidly as possible, and in any event in less than about 8 to 10 minutes. Preferably the cell aggregates are cooled through the phase change in 2 minutes or less. Cooling through the phase change can be carried out most rapidly and efficiently on organs or on small tissue cell suspensions. However, relatively large tissue cell suspensions can be cooled through the phase change in less than 10 minutes by using a container having large surface-to-volume ratio and a low temperature refrigerant such as liquid nitrogen. The increased viability of the frozen cells which results from rapid cooling through the phase change is demonstrated by illustrative Examples 5 and 6 hereinbelow.

In another preferred embodiment of the present invention, animal organs which are to be frozen in either whole or minced form are perfused under pressure prior to freezing. Any of the perfusion media described hereinabove can be employed. Whereas ordinary perfusion, that is perfusion without back pressure, serves to flush out the organ and contact the tissue cells with the protective additive, perfusion under back pressure sufficient to cause slight turgidity and/or distension of the organ results in increased viability of the cells. Back pressure during perfusion is generally obtained by the pressure of the perfusion fluid in intact venous systems. Back pressure can, if necessary, be obtained by partially restricting blood vessels of the organ during the perfusion process.

Rabbit kidneys can be obtained by the following procedure, although conventional alternative methods can also be used.

A young rabbit is sacrificed by intravenous or intraperitoneal injection of a lethal dose of pentobarbital, or by any other suitable means. The abdomen is thoroughly washed with a bacteriocidal and fungicidal agent such as, for example, a 1.3% Zephiran solution; and then an incision is made in the midline of the ventral wall from the diaphragm to the bladder and the intestines are pushed aside, thus exposing the dorsal aorta. The dorsal aorta posterior to the left renal artery, the coeliac artery, the superior mesenteric artery and all other arteries necessary to maintain a closed renal circulation are clamped off.

The dorsal aorta is cannulated anterior to the aortic clamp and perfusion is begun. This procedure can be carried out using an infusion pump, which is a conventional metering pump adapted to hold a sterile syringe so that there is no contact between the perfusion fluid and the pump itself and absolutely sterile conditions can be maintained. Perfusion in situ, as described, is not essential but it is the preferred method, since any attempt to perfuse the kidney after removal from the body of the animal would be greatly hindered because of the collapse of the arteries. Perfusion of the entire body can also be carried out and this method may be preferred for small animals.

Perfusion is carried out rapidly (5–10 ml./min.) at the start and then at a rate of about 1 ml./min. to a total volume of about 50 ml., or until perfusion is complete. This procedure serves to displace all blood from the kidney and to introduce into the tissues a protective medium which will prevent cell damage during the subsequent freezing and thawing procedures. Complete perfusion (that is, complete removal of blood) is easily recognized by a change in the original surface appearance of the kidney from reddish-brown (blood still present) to a uniform blanched brownish (tan) color.

After the perfusion step is completed, the kidneys are removed from the animal and trimmed of all external fat. One of three possible alternate procedures is then followed.

(1) Where freezing of the whole kidney is desired, the kidney is placed in a suitable container, such as a cylindrical aluminum can, a plastic bag, or a plastic-aluminum laminated container. The container ensures that sterility is maintained. Freezing is then carried out by the methods of this invention.

(2) The kidney can be minced after removal from the animal and then a suspension of the mince can be frozen.

In this procedure, the kidney is decapsulated and split lengthwise after removal from the animal and the calyx and most of the medulla is trimmed off and discarded. The cortical tissue is then cut into small chunks (minced) and suspended in perfusion fluid. (The perfusion step can, of course, be omitted where minced tissue is to be frozen, the minced cortical tissue from the unperfused kidney being suspended in a medium containing a protective additive.) The suspension is then poured into a suitable container (a cylindrical aluminum container having a diameter of 17 mm. has been used successfully) and frozen by the methods of this invention.

(3) The cell aggregates in the whole kidney or minced kidney can be broken down into single cells and then frozen. Single cells can be obtained by the trypsinization procedures described hereinbelow. The single cells are suspended in a medium containing a protective additive and the suspension is then frozen by the methods of this invention.

Monkey kidneys can be obtained by similar procedures with conventional modifications made necessary by the slightly different renal circulatory system of the monkey.

Bone marrow can be obtained by the following procedure:

The marrow is obtained by excising the femur (thigh bone) of the donor animal and flushing out the marrow plug with a suspending medium of the class described hereinabove. The marrow cells are embedded in a gelatinous matrix which is broken up by passing it repeatedly through a wire mesh screen or through hypodermic needles of various sizes. Marrow can also be obtained from the sternum (breastbone), vertebrae, posterior ilium (hipbone), ribs, and fetal hematopoietic tissue.

It may be necessary to combine the marrow cell aggregates with a suitable anticoagulant, such as acid-citrate-dextrose (ACD), heparin, or ethylene diamine tetraacetic acid (EDTA). The concentrations used are those ordinarily used for standard anticoagulation of blood, since the anticoagulant is most necessary to prevent clotting of contaminating peripheral blood in the marrow sample rather than to prevent clumping of the marrow cell aggregates themselves. Where the marrow is obtained by sacrifice of the donor animal, it is often not necessary to use an anticoagulant because the peripheral blood contamination can be kept to a minimum when the marrow-containing bone is excised or the animal is exsanguinated prior to marrow collection.

The bone marrow, with or without anticoagulant, is then added to a suspending medium, and the resulting suspension is combined with a protective additive solution. The suspending medium employed is a standard balanced salt solution, for example, Tyrode's or Hanks' media which have the following compositions expressed in grams per liter of solution:

|  | Tyrode's | Hanks' |
|---|---|---|
| NaCl | 8.00 | 8.00 |
| KCl | 0.20 | 0.40 |
| CaCl$_2$ | 0.20 | 0.14 |
| MgCl$_2$·6H$_2$O | 0.10 |  |
| MgSO$_4$·7H$_2$O |  | 0.20 |
| Na$_2$HPO$_4$·12H$_2$O |  | 0.12 |
| NaH$_2$PO$_4$·H$_2$O | 0.50 |  |
| KH$_2$PO$_4$ |  | 0.06 |
| NaHCO$_3$ | 1.00 | 0.35 |
| Glucose | 1.00 | 1.00 |
| Phenol Red (optional) | ¹ 1–5 |  |

¹ Mg. percent (wt./vol.).

The salt solution can be used alone or in combination with nutrient media of the class described hereinabove. Varying amounts of serum are commonly added to the suspending medium for nutrient purposes and to stabilize the cells. A typical suspending medium comprises Hanks' balanced salt solution containing 10 to 20 volume percent pooled homologous serum. A protective additive of the class described above is then added and the resulting suspension is frozen by the methods of this invention.

Typical procedures for isolating individual cells from thawed cell aggregates and for preparation of cell cultures are as follows:

Where minced tissue has been frozen in suspension, the thawed suspension can be used directly. Where a whole organ has been frozen, the thawed organ is minced and suspended in one of the suspending media described hereinabove.

In order to carry out the cell separation procedure, the suspension of minced tissue is placed in a trypsinizing flask. A solution of trypsin in a buffered salt solution containing 0.12% methylcellulose (15 centipoise grade) is added slowly with stirring. The trypsin concentration depends on the type of tissue and is usually in the range of about 0.1 to about 0.27 weight percent. The composition of a typical buffered trypsin solution is as follows:

|  | G. per 1000 ml. of aq. sol. |
|---|---|
| NaCl | 8.0 |
| KCl | 0.2 |
| $MgCl_2 \cdot 6H_2O$ | 0.1 |
| $Na_2HPO_4$ | 1.15 |
| $KM_2PO_4$ | 0.2 |
| $CaCl_2$ | 0.1 |
| Trypsin (1–300 grade) | 1.0 |

Trypsin is a proteolytic enzyme that catalyses the hydrolysis of peptide linkages in proteins. Trypsinization is a standard biochemical procedure used to break down tissues into their constituent cells. Collagenase, another proteolytic enzyme, can also be used, either alone or in combination with trypsin.

For about 5 grams of minced tissue, a total of 100 ml. of buffered trypsin solution is added, five 10 ml. aliquots being added at three-minute intervals, followed by the addition of the final 50 ml. Once all the trypsin solution has been added, the suspension is stirred for 10 minutes, the particles allowed to settle and the supernatant fluid is removed by decantation and discarded. This procedure is preferred since freshly trypsinized cells may liberate a cytotoxin which should be removed or it may destroy the suspended cells.

Following the removal of the cytotoxin, 100 ml. of the trypsin solution are added to the tissue fragments and the suspension is stirred for 30 minutes at room temperature. The tissue fragments are allowed to settle and the supernatant fluid containing dispersed cells is decanted into a centrifuge bottle. The cells are then collected by centrifugation and resuspended in GKN solution containing 10% serum and maintained at 0° C. This trypsinization step is repeated one or more times in order to completely break down the tissue fragments into their component cells. Use of GKN containing serum at this stage is based on the fact that serum contains an inhibiting agent which can neutralize the excess trypsin. Finally, the suspensions of discrete cells in GKN solution obtained from each trypsinizing step are all combined and the cells are then collected by centrifugation.

To prepare the cell culture, the cells are resuspended in a growth medium. Various conventional media can be employed. One that has proved satisfactory is a mixture of 40% serum and 60% MEM containing 10 ml. of 200 millimolar glutamine solution per liter of mixture. An aliquot of the suspension of cells in growth medium is removed for counting in order to provide a control sample. Finally, aliquots containing about $1 \times 10^4$ to $2 \times 10^6$ cells/ml. are placed in growth vessels and incubated at 37° C. in an atmosphere composed of 5% carbon dioxide and 95% air.

The process of this invention can be used to preserve individual cells which have been obtained from tissue cell aggregates by the above described trypsinization procedure (or other comparable methods for obtaining single cells from cell aggregates) or the cell aggregates can be preserved by the process of this invention and later broken down into individual cells if so desired.

A convenient method for comparing the viability of frozen and thawed cells with unfrozen controls is to compare the rate of growth of cells in a culture medium over a period of time of up to about 2 weeks. When the culture medium is inoculated with cells from an unfrozen control with a concentration of about $5 \times 10^5$ cells per milliliter and the growth cells incubated at 37° C. in an atmosphere comprising 5% carbon dioxide and 95% air, the cell concentration decreases slightly over the first few days and then increases toward a maximum concentration of about $1 \times 10^6$ to $2 \times 10^6$ cells/ml. The unfrozen control cells reach a concentration of about $1 \times 10^6$ to $2 \times 10^6$ cells/ml. after about 7 to 9 days of growth. The viability of the frozen and thawed cells can then be evaluated by the number of days of growth required to reach the cell concentration of $1 \times 10^6$ to $2 \times 10^6$ cells/ml. When the frozen and thawed cells reach this concentration within about 3 days longer growth than the unfrozen controls, the viability of the cells can be considered satisfactory. In a similar manner, the relative viability of two or more samples of frozen and thawed cells can be compared by the length of time necessary for the cultured cells to reach a concentration of $1 \times 10^6$ to $2 \times 10^6$ cells/ml.

A second method for evaluating viability of cells is the glycine incorporation technique. This method is based on the protein synthesizing capacity of the preserved cells. The technique used measures the uptake and incorporation of an amino acid labeled with a radioactive isotope, that is, measures the ability of the cell to admit the amino acid and then to incorporate it into the protein fraction of the cell. The acid used is $C^{14}$-labeled glycine (amino-acetic acid). The test shows whether or not the cell is capable of actively transporting glycine into its interior and also whether the glycine, once present inside the cell, can be utilized for protein synthesis. In order to assay for glycine incorporation, cells which have been subjected to the freeze-thaw procedure are incubated with glycine-2-$C^{14}$ at 37° C. and aliquots are removed at various time intervals. The acid-insoluble protein fraction of the cells is precipitated with cold, 10% trichloroacetic acid. The precipitate is washed with cold 5% trichloroacetic acid, then washed several times with 95% ethanol, and finally washed with absolute ethanol. The acid-precipitated protein fraction is then plated out on planchets (metal discs), dried, and the radioactivity counted in a gas flow counter.

A third method for evaluating the viability of cells is the cellular respiration technique. This method is based on the standard Warburgh manometric respiration technique (Manometric Techniques by W. W. Umbreit, R. H. Burris and J. F. Stauffer, Burges Publishing Company, 1957) using $10^{-3}$ molar glucose as a substrate. In this assay, the oxygen consumption of the cells as they respire is measured by means of a special manometer. The amount of oxygen consumed is measured over a period of time and indicates whether or not the cells are viable by their ability to respire as compared to control cells.

The use of cell cultures for the cultivation of viral agents is essential in the production of either live-virus or killed-virus vaccines for human use.

A virus is an extremely small agent which multiplies in living cells. Unlike microorganisms, viruses cannot be cultivated in synthetic media. Since living cells removed from the animal body lose their capability for carrying out the normal biological functions very rapidly, the preparation of cell or tissue cultures is essential for propagation of a virus if a host organism cannot be used.

One important example of a virus vaccine is poliomyelitis vaccine, the Sabin type being an example of a live-virus vaccine and the Salk type containing killed organisms. In the preparation of these vaccines the virus is cultivated in cell or tissue cultures. For example, cultured cells obtained from the cortex of rhesus or cynomolgus monkey kidneys are commonly used in poliomyelitis vaccine manufacture.

One of the advantages of the process of this invention is that whole or minced organs can be frozen and then stored at very low temperatures for long periods of time while maintaining a high percentage of viable cells. Thus, an animal can be sacrificed in or near its natural habitat, and then the frozen tissue can be transported under suitable refrigeration conditions to the country where the tissue is to be used in vaccine production. Not only is the expense and difficulty of transporting and handling live animals eliminated, but the problems involved in preservation and transport of cell suspensions under refrigeration conditions are avoided by the inherently simpler procedure of transporting frozen whole or minced organs. In addition, the complex cell separation procedures do not have to be carried out in an environment where conditions may be less favorable. Furthermore, stockpiling of preserved tissue to permit a flexible vaccine production schedule is an additional advantage of this invention.

The following illustrative examples are presented.

EXAMPLE 1

Two samples were employed in this example, one being subjected to the freezing, storage and thawing steps of the process of this invention and the other serving as an unfrozen control.

Preparation of control sample

A rabbit was sacrificed and the renal circulation isolated as previously described. The kidneys were perfused at a rate of 1 ml./min. with a total of 50 ml. of perfusion fluid of the following composition (volumetric basis):

| | Percent |
|---|---|
| Egg yolk | 10 |
| Glycerol | 20 |
| Rabbit serum | 20 |
| Eagle's MEM | 50 |

After perfusion was completed, the kidney was removed and the cortical tissue was minced. The minced tissue was trypsinized four times with a 0.25% trypsin solution, with the initial yield of cells being discarded in order to eliminate the cytotoxin. Finally, the trypsinized cells were washed twice with GKN containing 10% rabbit serum and resuspended in 25 ml. of growth medium. Fifty replicate tubes containing $5 \times 10^5$ cells per milliliter were prepared and incubated at 37° C.

Preparation of test sample

The procedure through the perfusion and mincing steps was identical to that employed with the control sample. The minced tissue was suspended in 10 ml. of the above-described perfusion fluid in a cylindrical aluminum container and cooled in a controlled rate freezer at a rate of approximately 1° C. per minute until the temperature reached −50° C. The container was then placed in the vapor phase of a liquid nitrogen refrigerator and maintained at a temperature of about −170° C. for four days. After removal from storage, the container was warmed by immersion in a 37° C. water bath. The thawed mince was then trypsinized using 0.1% trypsin solution by a procedure identical to that used with the control sample. Replicate tubes containing $1.1 \times 10^6$ cells per milliliter were prepared and incubated at 37° C.

Results

Growth curves comparing the growth obtained for the sample subjected to the freezing and thawing procedure with that obtained with the control sample were computed by conventional methods. The growth curves showed that the test sample grew at about the same rate as the control sample and attained about the same maximum cell concentration.

EXAMPLE 2

Six preparations of monkey kidney cells, designated Samples 1 to 6, were obtained by the methods described in detail hereinabove. The perfusion medium employed in obtaining Samples 1 through 6 had the following composition:

| | Percent |
|---|---|
| Egg yolk | 10 |
| Calf serum | 20 |
| Dimethylsulfoxide | 10 |
| Eagle's MEM | 60 |

*Sample 1.*—The kidney was perfused in situ, excised, frozen whole to a temperature of −47° C. at a rate of about 0.8° C. per minute, stored in liquid nitrogen vapor (about −170° C.) overnight, thawed rapidly in a 37° C. bath, minced, and trypsinized. The trypsinization was carried out using 0.19 percent trypsin in buffered solution at room temperature for two successive one hour periods.

*Sample 2.*—Same procedure as Sample 1 except that the trypsinization was carried out using 0.2 percent trypsin in buffered solution at room temperature for an initial period of ten minutes and then for three successive forty minute periods.

*Sample 3.*—The kidney was perfused in situ, excised, minced, frozen to a temperature of −42° C. at a rate of about 1.3° C. per minute, stored in liquid nitrogen vapor (about −170° C.) overnight, thawed rapidly in a 37° C. bath and trypsinized, the trypsinization being carried out as for Example 1.

*Sample 4.*—Same procedure as Sample 3 except that the trypsinization was carried out as for Sample 2.

*Sample 5.*—The kidney was perfused in situ, excised, minced and trypsinized as for Sample 1. This sample served as a perfused, non-frozen control.

*Sample 6.*—The kidney was excised, minced and trypsinized as for Sample 1. This sample served as a non-perfused, non-frozen control.

For each of the six preparations, following trypsinization, a viable cell count was made using vital staining techniques. Both bottle and tube cultures were then planted at a standard level ($1.5 \times 10^5$ cells/ml. for test tubes and $7.5 \times 10^4$ cells/ml. for bottles) and observed periodically. On the seventh day, groups of tubes from each of the six preparations were prepared for testing for virus sensitivity by comparing titers. (Virus sensitivity refers to the ability of the cell culture to support the growth of a particular type of virus. The titer is equal to the negative logarithm of the dilution factor for the lowest concentration at which the culture will propagate the virus, that is, if the virus preparation could be diluted to a concentration of $10^{-7}$ times the original value and growth would still occur then the titer would be 7.)

Also on the seventh day both tube and bottle cultures were inoculated with virus (poliomyelitis, adeno- and measles viruses) and harvested at estimated optimal time of virus yield and titered on a standard culture to give comparative virus yields.

In addition to the evaluation of cell cultures relative to virus sensitivity and propagation, uninoculated cultures were transferred from the growth medium to maintenance medium on the seventh day to evaluate the long-term maintenance of cell cultures prepared from preserved kidney tissue. (A maintenance medium is a nutrient medium capable of maintaining the cell metabolism but not of supporting growth.) Observation over an extended period of all kidney cell cultures intended for virus propagation is a standard precaution taken to ensure that a latent virus is not present in the cells.

Table I presents qualitative observations describing the cell cultures in growth medium and in maintenance medium as well as virus titers indicating virus sensitivity.

TABLE I

| Sample No. | Viable Cells Obtained per kidney after trypsinization ×10⁶ [1] | Evaluation of cell sheet After 7 days growth [2] | | Virus Titers on Tube Cultures [3] | | | Quality of [4] Tube Cultures 14 (days) | Quality of Bottle Cultures [4] | |
|---|---|---|---|---|---|---|---|---|---|
| | | Completeness | Quality | Polio | Adeno- | Measles | | 14 days | 28 days |
| 1 | 54 | ++ light[5], but O.K. for general use. | ++ clean, a few atypical cells. | 7.33 | | | Fair | Light, O.K. | Light, good. |
| 2 | 35 | + too light for general use. | + clean, frequent giant cells. | 6.66 | | | Poor | Poor | Very light, O.K. |
| 3 | 114 | ++++ good | ++++ granular | 7.5 | 3.63 | 3.33 | Good | Good | Light, Good. |
| 4 | 75 | +++ good | +++ granular | 6.83 | 3.5 | 2.66 | Fair to poor | Light, O.K. | Light, O.K. |
| 5 | 109 | ++++ very good. | ++++ granular | 7.5 | 4.38 | 3.5 | Good | Good | Good. |
| 6 | 180 | ++++ good, but with rounded cells. | +++ granular, foamy areas. | 7.5 | 4.0 | 3.66 | do | do | No test. |

[1] Based on Trypan Blue staining. All suspensions showed 85-90% viable. Differences in number of viable cells is due to different size of kidneys, difference in degree of trypsinization, and formation of cell fragments due to freeze-thaw damage.
[2] Completeness refers to the formation of confluent cell layers. Quality refers to appearance of individual cells (++++ indicates optimum). The term "clean" means that there is an absence of granules. The quality of cell growth was essentially the same in both tubes and bottles.
[3] The numbers presented here provide a comparison between test samples and control samples.
[4] These observations refer to the appearance of the cultures that were transferred from growth medium to maintenance medium on the 7th day.
[5] The term "light," as used in this table, means that the cell sheet is not contiguous.

Table II summarized the comparative yields from bottle cultures for each of the six preparations.

TABLE II.—VIRUS TITERS ON BOTTLE CULTURES

| Sample No. | Polio | | Adeno- | | Measles | |
|---|---|---|---|---|---|---|
| | 16-oz. | 28-oz. | 16-oz. | 28-oz. | 16-oz. | 28-oz. |
| 1 | 7.17 | | 2.50 | | 2.50 | |
| 2 | 6.50 | | | | | |
| 3 | 7.17 | 7.50 | 3.38 | | 2.63 | |
| 4 | 7.17 | | 3.16 | | 2.83 | |
| 5 | | 7.63 | | 3.83 | | 3.5 |
| 6 | 7.50 | 7.63 | 4.16 | | 2.83 | |

This example shows that the process of this invention can provide preserved tissue cell aggregates containing a high yield of viable cells capable of supporting virus growth.

EXAMPLE 3

The data presented in this example illustrate the importance of cooling the frozen cell aggregates from completion of the phase change to about −50° C. at a rate no greater than about 3° C. per minute.

In this example rabbit kidneys were perfused in situ employing a perfusion medium having the following composition:

| | Percent |
|---|---|
| Rabbit serum | 20 |
| Dimethylsulfoxide | 10 |
| Eagle's MEM | 70 |

Each kidney was minced, suspended in the perfusion medium, cooled from the freezing point through the phase change in a period of about 2 minutes and then cooled to a temperature of about −50° C. at the rates set forth in Table III. The samples were then cooled rapidly to liquid nitrogen temperatures, thawed rapidly in a water bath at 37° C., trypsinized and cultured by conventional procedures. The growth rate data for the various rates of cooling are presented in the following Table III. In the table, each cell concentration reading is the average of four culture tubes.

TABLE III.—VIABLE CELL CONCENTRATION (CELLS/ML.)

| Growth Period (Days) | Freezing Rate (° C./min.) | | | |
|---|---|---|---|---|
| | 0.96 | 3.1 | 4.1 | 8.0 |
| 0 | 5.4×10⁵ | 6.2×10⁵ | 5.0×10⁵ | 5.2×10⁵ |
| 4 | | 7.3×10 | | |
| 6 | 1.5×10⁵ | 2.5×10⁵ | 4.3×10⁴ | |
| 8 | 8.8×10⁵ | 1.0×10⁶ | 8.7×10⁴ | |
| 9 | 1.0×10⁶ | | | |
| 10 | | | 2.9×10⁵ | 2.2×10⁴ |
| 12 | | | 3.8×10⁵ | |
| 13 | | | | 4.1×10⁴ |

With freezing rates of 0.96 and 3.1° C./min. the cell cultures grew to cell concentrations of about 1×10⁶ cells/ml. in 8 to 9 days, while for 4.1 and 8.0° C./min. freezing rates the cells had not reached this concentration after 12 to 13 days. Cultured cells from unfrozen control kidneys grew to a concentration of about 1×10⁶ cells/ml. in about 7 days.

EXAMPLE 4

This example shows that the rate of cooling prior to the liquid-solid phase change is not critical.

In this example, three samples of rabbit bone marrow were suspended in media having the following compositions (volume percent):

| | Percent |
|---|---|
| Hanks' medium | 70 |
| Dimethylsulfoxide | 15 |
| Rabbit serum | 15 |

The samples were cooled to the freezing point at varying rates, then cooled to liquid nitrogen temperatures, and warmed to room temperature under substantially identical conditions. The viability of the frozen and thawed cells was compared with control samples which had not been cooled.

The results are summarized in Table IV.

TABLE IV

| Cooling rate (room temperature to freezing point), ° C./min.) | Viability as percent of control (cellular respiration method) |
|---|---|
| 1 | 74 |
| 3-4 | 69 |
| 8 | 72 |

EXAMPLE 5

This example shows that the time which the cells spend in the liquid solid phase change should be less than 8 to 10 minutes and preferably as short as possible.

Three samples of rabbit bone marrow (Group A) were suspended in media having the composition (volume percent):

|  | Percent |
|---|---|
| Hanks' medium | 70 |
| Dimethylsulfoxide | 15 |
| Rabbit serum | 15 | and three additional samples of rabbit bone marrow (Group B) were suspended in media having the composition (volume percent):

|  | Percent |
|---|---|
| Hanks' medium | 70 |
| Glycerol | 15 |
| Rabbit serum | 15 |

Each group of samples was cooled to the freezing point at a rate of about 1 to 2° C. per minute, cooled through the phase change in varying periods of time and then cooled to about −25° C. at 1° C. per minute, cooled rapidly to liquid nitrogen temperatures, and thawed in a water bath at 37° C. and viability compared with unfrozen control samples. The data are summarized in Table V. Viability of cells in Group A samples was measured by the $C^{14}$-glycine incorporation method and viability of cells Group B samples was measured by the cellular respiration method. These two viability assays have been shown to correlate with each other and with an irradiated animal assay. The viabilities are somewhat lower than in the previous example due to the inhibitory effect of the additive present. The data based on two assay methods and two additives show that the shortest heat of fusion period is better than the longer periods for optimum viability.

TABLE V

| Duration of phase change (min.) | Viability as percent of control | |
|---|---|---|
|  | Group A | Group B |
| 1–2 | 52 | 45 |
| 8–10 | 35 | 33 |
| 15–25 | 2 | 3 |

EXAMPLE 6

This example further illustrates the importance of cooling the tissue cell aggregates through the heat of fusion period as rapidly as possible. In this example rabbit kidneys were obtained by the general procedures outlined hereinabove. The rabbit kidneys were perfused with a perfusion medium containing:

2.5 wt. percent glucose
0.6 wt. percent methylcellulose (15 centipoise viscosity)
20% rabbit serum
16.9% water
10% dimethylsulfoxide
50% Eagle's MEM Before use, the perfusion medium was stirred for 1 hour in an atmosphere composed of 95 volume percent oxygen and 5 volume precent carbon dioxide at a pressure of 15 p.s.i.g. (pounds per square inch gauge).

The kidneys were then minced and suspended in the perfusion medium. Four samples of suspended rabbit kidney cells were cooled to the fusion temperature at about 1 to 2° C. per minute, cooled through the phase change in varying periods of time, cooled to −50° C. at about 1° C. per minute, quickly cooled to liquid nitrogen temperatures, thawed in a water bath at 37° C., cultured and the growth rate compared with unfrozen control samples. The culture media were inoculated with cells at a concentration of about $5 \times 10^5$ cells/ml. The unfrozen control reached a concentration of about $1 \times 10^6$ cells/ml. in seven days. The growth rate data for the cultures obtained from the frozen rabbit kidney cells are summarized in Table VI.

TABLE VI.—VIABLE CELL CONCENTRATION (CELLS/ML.)

| Growth period (days) | Duration of Phase Change (min.) | | | |
|---|---|---|---|---|
|  | 2 | 4 | 8 | 16 |
| 0 | $5.4 \times 10^5$ | $5.0 \times 10^5$ | $5.0 \times 10^5$ | $5.2 \times 10^5$ |
| 4 | $1.1 \times 10^5$ | $6.6 \times 10^4$ |  |  |
| 5 | $2.5 \times 10^5$ |  |  | $8.1 \times 10^4$ |
| 6 | $5.7 \times 10^5$ |  | $7.6 \times 10^4$ |  |
| 7 | $1.1 \times 10^6$ | $8.7 \times 10^4$ |  | $4.7 \times 10^5$ |
| 8 | $1.3 \times 10^6$ | $3.9 \times 10^5$ | $3.2 \times 10^5$ | $1.0 \times 10^5$ |
| 9 | $1.4 \times 10^6$ | $4.0 \times 10^5$ |  |  |
| 10 |  |  | $1.6 \times 10^5$ | $1.2 \times 10^5$ |
| 11 |  | $1.5 \times 10^6$ | $1.8 \times 10^6$ | $4.8 \times 10^5$ |
| 12 |  | $1.7 \times 10^6$ | $1.4 \times 10^6$ | $1.1 \times 10^6$ |
| 13 |  |  | $1.5 \times 10^6$ | $9.8 \times 10^5$ |

The data in Table VI shows that where the cells were cooled through the heat of fusion period in two minutes the rate of growth was approximately equal to that of unfrozen controls. Where the time in heat of fusion was 4 to 8 minutes, growth to a cell concentration of about $1 \times 10^6$ cells/ml. was delayed until about the tenth day. Where the cells spend 16 minutes in the heat of fusion period, the rate of growth was substantially retarded.

A comparison of Examples 5 and 6 shows that the importance of cooling cells rapidly through the heat of fusion period is demonstrated equally well by three different criteria of viability; namely, $C^{14}$-glycine incorporation, cellular respiration, and period of time for growth of cultured cells from about $5 \times 10^5$ cells/ml. to about $1 \times 10^6$ cells/ml.

EXAMPLE 7

This example illustrates the importance of maintaining back pressure during perfusion of an organ. Two whole rabbit kidneys were obtained by procedures outlined above and were perfused in situ with a perfusion medium having the following compositions:

2.5 wt. percent glucose
0.6 wt. percent methylcellulose (15 centipoise viscosity)
20% rabbit serum
16.9% water
10% dimethylsulfoxide
50% Eagle's MEM Before use, the perfusion medium was stirred for 1 hour in an atmosphere composed of 95 volume percent oxygen and 5 volume percent carbon dioxide at a pressure of 15 p.s.i.g.

Both kidneys were completely perfused but in one kidney a vein was cut so that there was essentially no back pressure during the perfusion operation. Both whole kidneys were placed in aluminum containers and were cooled to −50° C. at an average rate of about 1° C. per minute, quickly frozen to liquid nitrogen temperatures, thawed in a water bath at 37° C., minced, trypsinized and cultured at an initial cell concentration at about $5 \times 10^5$ cells/ml. The cells from the kidney perfused with back pressure reached a cell concentration of about $1.4 \times 10^6$ cells/ml. in 9 days. The cells from the second kidney, perfused without back pressure, grew very poorly and reached a maximum cell concentration of only $4 \times 10^4$ cells/ml.

EXAMPLE 8

This example illustrates the methods of this invention as applied to the preservation of rat lung.

Rat lung was perfused in situ with a medium having the following compositions:

2.5 wt. percent glucose
0.6 wt. percent methylcellulose (15 centipoise viscosity)
20% fetal calf serum
16.9% water
10% dimethylsulfoxide
50% Eagle's MEM The perfusion medium was stirred for 1 hour in an atmosphere composed of 95 volume percent oxygen and 5 volume percent carbon dioxide at a pressure of 15 p.s.i.g. prior to use.

The perfused lung was minced, suspended in perfusion medium, cooled to the freezing point, cooled through the phase change in about 6 minutes, further cooled to about −50° C. at 1 to 2° C. per minute, further cooled to liquid nitrogen temperatures and then thawed by immersion in a 37° C. water bath. The lung tissue was broken down into individual cells by treatment with a buffered medium containing both trypsin and collagenase by the procedures described hereinabove. The frozen and thawed cells, cultured at an initial concentration of about $5 \times 10^5$ cells/ml., grew to a concentration of about $1 \times 10^6$ cells/ml. in about 10 days. Cultured control cells from a rat lung subjected to identical treatment except for the freezing and thawing steps grew from an initial concentration of about $5 \times 10^5$ cells/ml. to a concentration of about $1 \times 10^6$ cells/ml. in about 9 days.

EXAMPLE 9

This example illustrates a preferred trypsinization procedure especially suitable for use in trypsinizing tissues, particularly minced tissues, which have been frozen in accordance with the practice of this invention.

Trypsinization solution

The trypsinization solution employed in this example is prepared as follows:

A 10 weight percent solution of trypsin was produced by adding trypsin powder to an aqueous solution containing the following materials:

| | Grams per liter |
|---|---|
| Methyl cellulose (15 cps.) | 6.0 |
| NaCl | 8.0 |
| KCl | 0.4 |
| $Na_2HPO_4$ | 0.06 |
| $KH_2PO_4$ | 0.06 |
| Glucose | 50.0 |

The mixture so formed was stirred with a magnetic stirrer for 10 minutes at 4° C. and then, centrifuged at 1000 revolutions per minute at 4° C. The supernatant liquid was decanted and diluted with 50 equal volumes of aqueous solution containing the following materials:

| | Grams per liter |
|---|---|
| NaCl | 8.0 |
| KCl | 0.04 |
| $Na_2HPO$ | 0.06 |
| $KH_2PO_4$ | 0.06 |
| $NaHCO_3$ | 0.5 |

The final diluted solution was filtered in order to sterilize it, and the filtrate so obtained (contained 0.2 weight percent trypsin) was used as a trypsinization solution as described below.

CELL GROWTH MEDIA

The cell growth media employed in this example and in the following example contained from 2 to 40 volume percent of calf serum, 0.5 weight percent lactalbumin hydrolysate, 200 micromoles of glutamine, and from 60 to 98 volume percent of MEM (defined above).

Trypsinization procedure

The following trypsinization procedure was used in this example:

An aluminum tube containing frozen minced tissues is immersed in a bath maintained at 37° C. for 3.5 minutes with periodic inversion of the tube to insure proper warming and thawing of the tissues. The thawed minced tissues are decanted into an indented trypsinization flask and a portion (e.g. 200 milliliters) of the above-described trypsinization solution is added to the flask. The tissue is then trypsinized by stirring the contents of the flask for about one hour, employing a magnetic stirrer at the outset of the stirring, the contents of the flask are at about 4° C. and at the end of the hour they have warmed to about room temperature. The stirring is at a rate sufficient to cause good agitation of the tissue-solution mixture but not so great as to cause frothing of the trypsinization soltuion. The untrypsinized tissues are allowed to settle and the supernatant liquid containing the trypsinized cells is decanted through gauze. If trypsinization is incomplete, another portion (e.g. 200 milliliters) of the trypsinization solution is added to the flask containing the untrypsinized tissues and the trypsinization is repeated (e.g. for about 0.5 to 1.0 hour) until trypsinization is complete. The contents of the flask are allowed to settle and the supernatant liquid containing the trypsinized cells is decanted through gauze. The portion (or portions) of supernatant liquid so obtained by filtration through gauze is centrifuged at 600 revolutions per minute for 15 minutes. The supernatant liquid from the centrifuge tube is decanted and the cells which have separated during the centrifuging are resuspended in 10 to 20 milliliters of the above described growth medium containing 10 volume percent calf serum and 90 volume percent MEM. The resuspended cells are again centrifuged at 600 revolutions per minute, the supernatant liquid is decanted and the cells which had separated are again resuspended in 10 to 20 milliliters of growth medium. The yield and viability of the latter resuspended cells is determined by the vital staining method described above. The resuspended cells are stored at 4° C. till used (e.g. as described in Example 10).

Results

The following table summarized the results obtained when minced monkey kidney tissues and minced rabbit kidney tissue, which had previously been frozen in accordance with the practice of this invention, were thawed and trypsinized in accordance with the above procedure. For comparison purposes, the table shows results obtained when unfrozen minced monkey kidney tissue and rabbit kidney tissue were similarly processed.

RESULTS OF TRYPSINIZATION.—TRYPSINIZATION

| Animal | Prior Treatment | Tissue | Time, hr. | Solution, ml. | Percent Viability | Percent Trypsinization | Cell Yield [2] |
|---|---|---|---|---|---|---|---|
| Cynomolgus Monkey | Unfrozen | Cortex | 1.5 | 200 | [1] 92 | [1] 64.5 | [1] $6.7 \times 10^7$ |
| Cynomolgus Monkey | Frozen DMSO+$O_2$ [3] | do | 1 / 0.5 | 200 / 200 | [1] 76.5 | [1]*50-80 | [4] $6.9 \times 10^7$ |
| Rhesus Monkey | Frozen DMSO+$O_2$ [3] | do | 1 / 0.5 | 200 / 200 | 75 | <50 | [4] $4.1 \times 10^7$ |
| Rabbit | Unfrozen | do | 1 | 100 | 89 | | $5.4 \times 10^7$ |
| Rabbit | Frozen DMSO+$O_2$ [3] | do | 1 | 100 | [1] 87.5 | [1] 73.5 | [1] $7.9 \times 10^7$ |
| Rabbit | Unfrozen | Whole | 1 | 100 | 88 | | $6.7 \times 10^7$ |
| Rabbit | Frozen DMSO+$O_2$ [3] | do | 1 | 100 | [1] 88 | [1] 76 | [1] $9.2 \times 10^7$ |

[1] Average of two runs.
[2] Yield of cells per gram of frozen tissue, unless otherwise noted.
[3] Minced tissue frozen in accordance with the process of this invention after treatment with 10 weight percent dimethylsulfoxide solution saturated with oxygen and also containing serum, MEM and methyl cellulose.
[4] Cells per kidney.
*Estimation.

It has been found that the stirring step in the above described trypsinization procedure is critical. Excellent results (as evidenced by high percent trypsinized cell solution mixture. When this stirring procedure was for a period no longer than from 1 to 4 hours at 30° C. to 12 to 17 hours at 4° C. The optimum time of stirring is inversely proportional to the temperature of the tissue-solution mixture. When this stirring procedure was varied significantly (e.g. when this stirring was conducted for 12 hours at room temperature), drastically reduced percent cell viability was observed. It is also highly desirable to stir the tissue-trypsinization solution mixture near but below the rate of stirring at which frothing occurs.

EXAMPLE 10

This example illustrates the improved growth of cells achieved when the preferred trypsinization procedure described in Example 9 is coupled with the preferred cell growth procedure described below.

Cell growing procedure

Portions of resuspended cells as obtained in Example 9 cells are diluted to a concentration of $5 \times 10^5$ cells per milliliter and then are added to both standard 12.5 centimeter x 15 millimeter test tubes and to standard 8 ounce prescription bottles. One milliliter of diluted resuspended cells is added to the tubes and 10 milliliters to the prescription bottles. Duplicate runs were made in the tubes and bottles to determine if the container configurations had any effect on cell growth. No effect due to container configuration was observed.

A straim of a gaseous mixture consisting of 5 volume percent carbon dioxide and 95 volume percent of air was brought in contact with the surface of the cell suspensions for a short period of time, e.g., from 1 to 4 seconds. The gaseous mixture was drawn from pressurized tanks (pressure in the tanks were from 200 to 2200 p.s.i.g.). The mixture was conducted from the tanks to the surfaces of the suspensions through a filter (6½ inches long and 1 inch diameter) and then through a diameter tube (1 inch long and 1/16 inch diameter) and had a considerable velocity on contact with the surfaces of the suspensions. The tubes and bottles were then sealed and incubated at 37° C. In the case of the tubes, the original growth media was replaced with fresh growth media every 48 hours. This was not required in the bottles since the media therein was not depleted appreciably during the cell growth period.

Rhesus Monkey Tissue

Three suspensions of rhesus monkey kidney tissue which had been trypsinized as described in Example 9 were subjected to the above described cell growing procedure using growth media containing 10, 20 and 40 weight percent calf serum respectively. Three other rhesus monkey kidney tissue suspensions were prepared similarly except that the surfaces of the suspensions were not brought into contact with the carbon dioxide-air mixture. After 24 hours, the cell suspensions that had been treated with the carbon dioxide-air mixture exhibited better attachment to the inner walls, the glass containers and better growth than the other (non-gassed) cell suspensions. In addition, the cell suspensions that had been treated with the carbon dioxide-air mixture had a pH of about 7.1 to 7.3 whereas the cell suspension that had not been so treated had a pH of about 7.6 to 7.8. After 6 to 7 days of incubation complete confluent sheeting of the cell suspensions that had been treated with the carbon dioxide-air mixture was noted on the container walls. No further growth and no sheeting of the cell suspensions that had not been treated with the carbon dioxide-air mixture was noted. After 8 days the cell count in the tube containing the suspension having 10 volume percent serum that had been treated with the carbon dioxide-air mixture was $1.3 \times 10^6$ cells per milliliter.

Cynomolgus monkey tissue

The two frozen cynomolgus monkey kidney tissue suspensions prepared as described in Example 9 were combined and cultured in both tubes and bottles in cell growth media containing serum concentrations of 2 volume percent, 5 volume percent and 10 volume percent serum. The tubes and bottles were the same as described above. These samples were subjected to the cell growing process described above. Three other samples of the combined suspensions were similarly treated except that they were not contacted with the carbon dioxide-air mixture. After 24 hours of incubation, attachment of cells to the container inner surfaces was noted in all of the containers but there was more attachment in the containers where the cell suspensions had been contacted with the carbon dioxide-air mixture. After 6 days of incubation, confluent sheeting on the container inner surfaces was noted in all of the containers but greater cell growth was observed where the cell suspensions had been treated with the carbon dioxide-air mixture. The yields of cells in the tubes were as follows:

| Serum Concentration (vol.-percent) | Yield of Tissue Cells Treated with $CO_2$-Air | Yield of Tissue Cells Not Treated With $CO_2$-Air |
|---|---|---|
| 2 | $1.1 \times 10^6$ | $1.7 \times 10^4$ |
| 5 | $1.1 \times 10^6$ | $2.6 \times 10^4$ |
| 10 | $1.3 \times 10^6$ | $2.2 \times 10^4$ |

The latter yields indicate the desirability of contacting the cell suspensions with a stream of an air-$CO_2$ mixture, prior to growth. Apparently carbon dioxide is absorbed by the suspensions from such mixtures and retards undesirable increases in the pH of the suspensions above about 7.3 during cell growth. In general, it is preferred to contact the cell suspensions with streams of air-$CO_2$ mixtures containing from 2 to 20 volume percent $CO_2$ and from 80 to 98 volume percent air. Alternately, good results can be achieved by using conventional buffers to prevent the pH rising above about 7.3 during the growth of the cells. The pH should also be no lower than about 7.0.

What is claimed is:

1. A process for preserving animal organs which comprises (1) perfusing the organ with a perfusion medium containing nutrients for the cells in said organ and a protective additive to reduce damage to the cells of the organ during subsequent freezing, (2) cooling the perfused organ to the freezing point, (3) further cooling the perfused organ through the liquid-solid phase change in less than about 10 minutes, (4) further cooling the solidified organ to about −50° C. at a rate of not more than about 3° C. per minute, and (5) further cooling the frozen organ and maintaining the frozen organ at a temperature below about −130° C.

2. A process for preserving the tissue of animal organs which comprises (1) perfusing the organ with a perfusion medium containing nutrients for the cells in said organ and a protective additive to reduce damage to the cells of the organ during subsequent freezing, (2) mincing the perfused organ and suspending the mince in said perfusion medium, (3) cooling said suspension to the freezing point, (4) further cooling said suspension through the liquid-solid phase change in less than about 10 minutes, (5) further cooling said suspension to about −50° C. at a rate of not more than about 3° C. per minute, and (6) further cooling the frozen suspension and maintaining the frozen suspension at a temperature below about −130° C.

3. A process for preserving monkey kidneys which comprises (1) perfusing the kidney under sufficient back pressure to cause turgidity and distension of said kidney with a medium having one of the following compositions (in volume percent unless otherwise noted):

(A)
10% egg yolk
20% serum
20% glycerol
50% Eagle's MEM (B)
10% egg yolk
20% serum
10% dimethylsulfoxide
60% Eagle's MEM (C)
2.5 wt. percent glucose
0.6 wt. percent methylcellulose (15 centipoise viscosity)
20% serum
16.9% water
10% dimethylsulfoxide
50% Eagle's MEM (2) cooling the perfused kidney to the freezing point, (3) further cooling the perfused kidney through the liquid-solid phase change in less than about 10 minutes, (4) further cooling the solidified kidney to about −50° C. at a rate of not more than about 3° C. per minute, and (5) further cooling the frozen kidney and maintaining the frozen kidney at liquid nitrogen temperatures.

4. A process for preserving monkey kidney tissue which comprises (1) perfusing the kidney under sufficient back pressure to cause turgidity and distension of said kidney with a medium having one of the following compositions (in volume percent unless otherwise noted):

(A)
10% egg yolk
20% serum
20% glycerol
50% Eagle's MEM (B)
10% egg yolk
20% serum
10% dimethylsulfoxide
60% Eagle's MEM (C)
2.5 wt. percent glucose
0.6 wt. percent methylcellulose (15 centipoise viscosity)
20% serum
16.9% water
10% dimethylsulfoxide
50% Eagle's MEM (2) mincing the perfused kidney and suspending the mince in said perfusion medium, (3) cooling said suspension to the freezing point, (3) further cooling said suspension through the liquid-solid phase change in less than about 10 minutes, (4) further cooling said suspension to about −50° C. at a rate of not more than about 3° C. per minute, and (5) further cooling the frozen suspension and maintaining the frozen suspension at liquid nitrogen temperatures.

5. In a process for preserving animal organs in which the organ to be preserved is perfused with a medium containing a protective additive to reduce damage to the cells of the organ during subsequent freezing and thereafter cooled to a temperature below about −75° C., the improvement which comprises perfusing said organ under sufficient back pressure to cause turgidity and distension of said organ.

References Cited by the Examiner

UNITED STATES PATENTS

| | | | |
|---|---|---|---|
| 402,736 | 5/1889 | Holgate | 62—62 X |
| 1,420,739 | 6/1922 | Petersen | 62—64 |
| 1,420,740 | 6/1922 | Petersen | 62—64 |
| 2,261,808 | 11/1941 | Morris | 62—293 X |
| 2,958,630 | 11/1960 | Keil | 195—29 |
| 2,979,438 | 4/1961 | Highberger | 195—4 |
| 3,128,228 | 4/1964 | Michel | 167—78 |
| 3,128,231 | 4/1964 | Melnick | 167—78 |
| 3,155,589 | 11/1964 | Slater | 167—78 |

OTHER REFERENCES

Nature, volume 190, June 24, 1961, pages 1202–1204.

EDWARD J. MICHAEL, *Primary Examiner.*